May 31, 1966 R. F. SKELTON 3,253,745
DELAY CONTROL SWITCH AND HOPPER FOR FEEDING
FINELY DIVIDED MATERIALS
Filed Nov. 12, 1964

INVENTOR.
ROBERT F. SKELTON
BY
Wheeler Wheeler and Wheeler
ATTORNEYS.

United States Patent Office 3,253,745
Patented May 31, 1966

3,253,745
DELAY CONTROL SWITCH AND HOPPER FOR FEEDING FINELY DIVIDED MATERIALS
Robert F. Skelton, Bluffton, Ind., assignor to Mix-Mill, Inc., Bluffton, Ind., a corporation of Indiana
Filed Nov. 12, 1964, Ser. No. 410,630
4 Claims. (Cl. 222—56)

This invention relates to a delay controlled switch and hopper for feeding finely divided materials.

The object of the invention is to provide a paddle controlled switch for use in a hopper, which is so constructed that the finely divided material with which the hopper is used will not build up behind the paddle switch and prevent it from operating. A further object is to provide a paddle switch which will not be rendered inoperative by materials jammed between the side of the paddle switch and the side of the compartment it occupies. Finally, it is an object of the invention to provide a hopper construction which assists in preventing build-up of the finely divided material behind the paddle of the switch.

Figure 1:
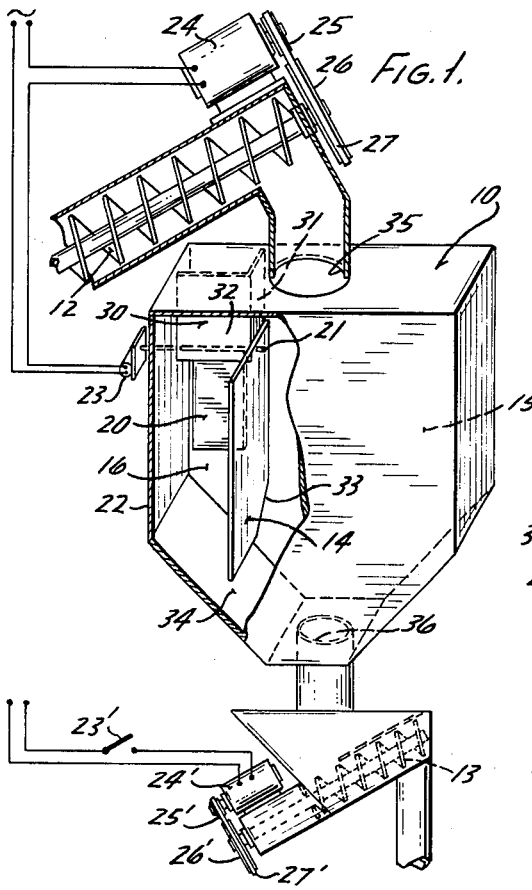
FIG. 1 is a side perspective view of the hopper and paddle switch of my invention with portitons broken away for clarity.
Figure 2:
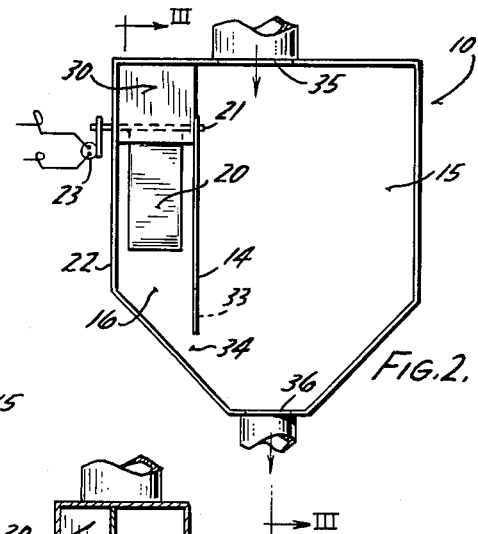
FIG. 2 is a lateral cross-sectional view through the device of my invention.
Figure 3:
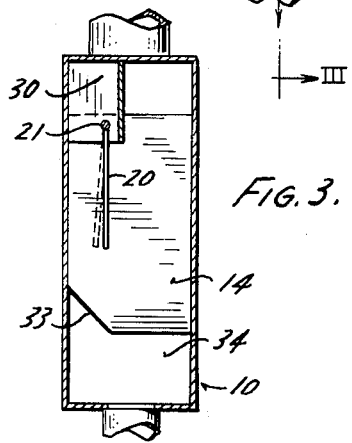
FIG. 3 is a cross-sectional view on line III—III of FIG. 2.

As shown most clearly in FIG. 1, my invention includes a hopper or bin 10 which serves to hold finely divided matreial 11 which has been fed into the hopper by auger 12. Auger 13 serves to remove the finely divided material from the bin 10. Particularly in applications where it is desired that auger 13 have a precisely metered rate of flow, it is highly desirable to interpose a bin 10 and supply auger 12 between the main storage bin for material 11, and the metering auger 13, so that there is no necessity for storing the entire body of finely divided material above the metering auger 13. This arrangement avoids great changes in the level of the material fed by metering auger 13. This system works best with a feed auger 12 which is larger, or otherwise has more capacity, than metering auger 13, auger 12 being operated intermittently to fill the small bin 10. It will be understood that conveyors other than augers could be used.

However, this arrangement requires rather precise control of the supply auger 12 to prevent either overfilling or complete emptying of bin 10. To achieve this, I provide a partition 14 which divides the bin 10 into a bin 15 and a controlling bin 16. A paddle 20 is suspended crosswise of control bin 16 on a pivot rod 21 extending through partition 14 and wall 22 of bin 10. The end of pivot rod 21 carries a mercury switch 23, or in the alternative, may control a switch of some other type, such as a microswitch.

Switch 23 is in series with motor 24, which drives supply auger 12 in any conventional way, as by means of pulleys 25 and 26 and V-belt 27. Thus, the supply of finely divided material to bin 10 is entirely dependent on the position of paddle 20, which normally hangs vertically under the influence of gravity unless it is deflected by finely divided material in front of the paddle, as shown best in FIG. 6.

Auger 13 is driven by a separate motor 24', which may include pulleys 25' and 26' and belt 27'. The control means for motor 24' are not material to the invention except that they include a switch 23' separate from switch 23, and controlled independently.

Partition 14 extends from side to side of bin 10, but does not extend either to the top or to the bottom of the bin across its full width. A partition 30 is provided at the top of partition 14, partition 30 being L-shaped and having a surface 31 which is an extension of partition 14, and a surface 32 at right angles to partition 14 and extending to wall 22 of bin 10. Surface 32 of partition 30 is placed closer to the center of bin 10 than pivot rod 21 (in front of paddle 20) so that partition 30 completely blocks the entrance of finely divided material from main bin 15 to control bin 16 in the area above and behind paddle 20, but permits finely divided material to flow over the top of partition 14 into control bin 16 at the front of paddle 20.

Partition 14 is also provided with a relief space 33 (or other opening) at or near its bottom margin and behind paddle 20. As shown in the drawings, this comprises a corner which has been cut from partition 14 to leave a triangular opening 33 above the opening 34 which extends entirely across bin 10 below partition 14. However, it would be possible to achieve the same result by cutting a hole in partition 14, near the bottom edge and behind paddle 20.

Bin 10 is provided with an upper opening 35 through which material is delivered from auger 12 and with a lower opening 36 through which material flows by gravity to auger 13.

Figure 4:
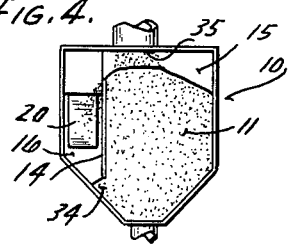
FIGS. 4, 5, 7 and 8 are views similar to FIG. 2 on a reduced scale showing finely divided material at various levels within the hopper of my invention.
Figure 7:
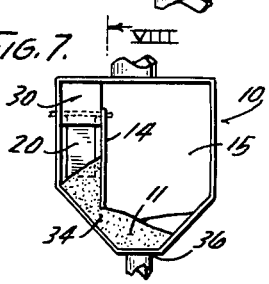
Figure 8:
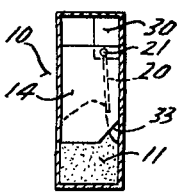
Figure 5:
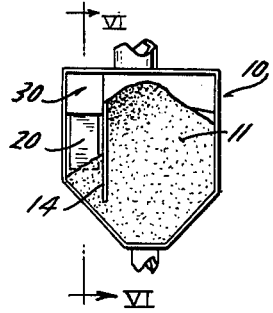
Figure 6:
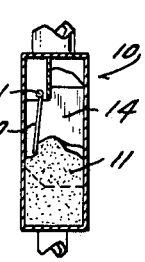
FIG. 6 is a view on line VI—VI of FIG. 5 showing finely divided material in the hopper of my invention.

In operation, when paddle 20 is vertical, switch 23 is on and upper auger 12 is being driven by motor 24. As shown in FIG. 4, material is supplied to main bin 16, but does not enter control bin 16 to any substantial extent until main bin 15 is full above the level of the top of partition 14. Upon further filling of main bin 15, the finely divided material flows into control bin 16 as shown in FIG. 5 and FIG. 6, and the paddle 20 is deflected to actuate switch 23 to the off position. Upon independent actuation of switch 23', auger 13 removes finely divided material from bin 15 as shown in FIG. 7, but because the material is solid rather than liquid, there is substantially no withdrawal of material from control bin 16 until the level of finely divided material 11 reaches the relief 33 in partition 14. As shown in FIG. 8, material 11 is then withdrawn first from the space behind paddle 20, assuring that the material behind the paddle will be withdrawn in each cycle of operation, and will not be compressed and caused to cake by successive operations of the paddle on the same finely divided material trapped behind paddle 20. After the space behind paddle 20 has been emptied, the level of finely divided material 11 in main bin 15 will drop below the lower edge of partition 14, at which time finely divided material 11 will be withdrawn from the front of paddle 20, allowing the paddle to return to a vertical position and actuate switch 23 to its on position. Auger 12 will then begin refilling main bin 15 of hopper 10. Because of the solid nature of the finely divided material, control bin 16 will not be filled through opening 34 or relief 33 to any substantial extent but will remain nearly empty until material again spills over the top of partition 14 as main bin 15 is filled.

Thus, it will be seen that material will never remain behind paddle 20 to be compressed by subsequent pressure on the front of paddle 20. There will also be slight tendency for material to occupy the space behind paddle 20 in the first instance, because partition 30 prevents the filling of control bin 16 from the back of the paddle. In addition, the sides of paddle 20 are spaced at least one-half inch away from partition 14 and wall 22, so that material such as corn cannot jam between the walls and the paddle and prevent automatic operation of switch 23 at the proper times.

I claim:
1. Means for maintaining the level of finely divided material between specified levels in a bin comprising:
  (1) a bin,
  (2) an opening at the bottom of the bin,
  (3) a first conveyor adapted to remove material from the bin through said bottom opening,
  (4) a second conveyor adapted to supply said material to said bin at a defined discharge point at the top of said bin,
  (5) a generally vertical first partition within said bin dividing said bin into a main bin and a control bin,
    (a) said bottom opening and said discharge point being within said main bin,
    (b) said control bin being open to said main bin only at the top and bottom of said first partition,
  (6) control means for said second conveyor, including a switch having a paddle actuator disposed in said control bin,
  (7) said paddle having a front and a back exposed to the contents of said control bin and being adapted to actuate said switch to the "off" position upon filling of said control bin in front of said paddle beyond a predetermined high level and being adapted to actuate said switch to the "on" position upon emptying of said control bin beyond a predetermined lower level in front of said paddle,
  (8) means for operating said first conveyor independently of said control means,
  (9) said paddle being mounted substantially at right angles to said first partition,
  (10) the lower margin of said first partition extending generally horizontally in the region ahead of said paddle,
  (11) said first partition having an opening in the region behind said paddle and above the lower margin of said partition,
  (12) whereby during operation of said first conveyor the material is removed first from the main bin, then from the control bin behind the paddle and lastly from the control bin in front of the paddle.

2. The device of claim 1 in which said paddle is pivotally mounted between said first partition and a wall of said control bin and gravity biased to a vertical position, and said switch comprising a mercury switch mounted to move with said paddle.

3. The device of claim 1 in which the opening in said first partition comprises an upwardly relieved portion of said lower margin of said partition.

4. The device of claim 1 further comprising a second partition in said bin shaped to prevent material in said main bin from entering said storage bin over the portion of said first partition behind said paddle.

References Cited by the Examiner

UNITED STATES PATENTS

| | | | |
|---|---|---|---|
| 2,276,383 | 3/1942 | Francis | 222—56 |
| 2,408,221 | 9/1946 | Michel | 222—56 |
| 2,674,396 | 4/1954 | Peterson | 222—56 |
| 3,110,420 | 11/1963 | Brewer | 222—56 |

FOREIGN PATENTS 135,496  11/1949  Australia.

LOUIS J. DEMBO, *Primary Examiner.*

HADD S. LANE, *Assistant Examiner.*